United States Patent [19]

Glenn

[11] Patent Number: 5,231,432
[45] Date of Patent: Jul. 27, 1993

[54] PROJECTOR UTILIZING LIQUID CRYSTAL LIGHT-VALVE AND COLOR SELECTION BY DIFFRACTION

[75] Inventor: William E. Glenn, Ft. Lauderdale, Fla.

[73] Assignee: Florida Atlantic University, Boca Raton, Fla.

[21] Appl. No.: 801,942

[22] Filed: Dec. 3, 1991

[51] Int. Cl.$^5$ .............................................. G03B 21/00
[52] U.S. Cl. ........................................ 353/31; 353/34; 353/37; 359/40
[58] Field of Search .................. 353/31, 33, 34, 37, 353/97, 38, 122; 359/40, 566, 567, 568, 569, 576

[56] References Cited

U.S. PATENT DOCUMENTS

| | | |
|---|---|---|
| Re. 25,169 | 3/1962 | Glenn . |
| 2,919,302 | 12/1959 | Glenn, Jr. . |
| 2,943,147 | 6/1960 | Glenn, Jr. . |
| 2,995,067 | 8/1961 | Glenn, Jr. . |
| 3,044,358 | 7/1962 | Glenn, Jr. . |
| 3,084,590 | 4/1963 | Glenn, Jr. . |
| 3,118,969 | 1/1964 | Glenn, Jr. . |
| 3,209,072 | 9/1965 | Glenn, Jr. . |
| 3,270,613 | 9/1966 | Glenn, Jr. . |
| 3,291,903 | 12/1966 | Glenn, Jr. . |
| 3,291,907 | 12/1966 | Glenn, Jr. . |
| 3,320,468 | 5/1967 | Glenn, Jr. .................. 315/14 |
| 5,101,279 | 3/1992 | Kurematsu et al. .................. 359/40 |

FOREIGN PATENT DOCUMENTS

| | | | |
|---|---|---|---|
| 0157215 | 9/1982 | Japan | 359/40 |
| 0062131 | 12/1985 | Japan | 359/41 |
| 0089025 | 3/1990 | Japan | 359/41 |
| 0184019 | 8/1991 | Japan | 359/40 |

OTHER PUBLICATIONS

"A 750-TV-Line-Resolution Projector Using 1.5-Megapixel a-Si TFT LC Modules", Kazuhiko, et al, SID 91 DIEST pp. 415-418.
A. 1.5 Megapixel a-Si TFT-LCD Module for HD TVE Projector, Y. Okita, et al. SID 91 Digest, pp. 411-414.
"High-Quality-Image EDTV Liquid-Crystal-Projector", M. Sakamoto, et al., SID 91 Digest, pp. 419-422.
"An Improved Frame-Sequential Color Projection with Modified CdSe-TFTs", M. Dobler, et al, SID 91 Digest, pp. 427-429.
"100-in. Extra-Slim Liquid-Crystal Rear-Projection Display" K. Fukuda, et al., SID 91 Digest, pp. 423-426.

Primary Examiner—William A. Cuchlinski, Jr.
Assistant Examiner—William C. Dowling
Attorney, Agent, or Firm—Brumbaugh, Graves, Donohue & Raymond

[57] ABSTRACT

A projection system which produces a color image on a screen corresponding to an applied color signal. In a preferred embodiment, light beams from a source of white light are separated by a dichroic mirror into two beams, one containing green and the other containing blue and red. The beam containing green illuminates a first active matrix liquid crystal panel which contains electrodes which define a diffraction grating having parameters corresponding to green, and the beam containing blue and red illuminates a second active matrix liquid crystal panel which contains electrodes which form two separate diffraction gratings, one having parameters corresponding to red and the other having parameters corresponding to blue. As each beam passes through its respective LC panel its transmittance is modulated in accordance with video information signals applied to the panels, and the red and blue colors are selected by diffraction. The LC panels are embodied in a schlieren optical system for converting modulations of the LC panels and the colors selected by diffraction into an image.

18 Claims, 2 Drawing Sheets

PROJECTOR UTILIZING LIQUID CRYSTAL LIGHT-VALVE AND COLOR SELECTION BY DIFFRACTION

BACKGROUND OF THE INVENTION

This invention relates to systems for projecting colored images and, more particularly, to an improved system for large screen display of electronic video information such as high definition television.

The projection of color images, for example color television pictures, has been accomplished by systems employing various combinations of electric and optical equipment. In a system described in U.S. Pat. No. 2,813,146, dated Nov. 12, 1957, color images are produced by a deforming light modulating medium, for example a deformable oil film, as it is scanned by an electron beam to provide diffraction gratings thereon containing intelligence with respect to the color components, so that light projected through the modulating medium and through a suitable light masking system conveys both the intensity variation and the color selection to the screen in point-by-point correspondence with the scene to be reproduced.

High definition television (HDTV) systems are being developed in countries around the world, bringing attention to the need for the development of larger screen devices suitable for the display of these high quality pictures. The recent development of active matrix liquid crystal displays (AMLCD) using thin film transistors (TFT) as switching elements have made such devices attractive for use in light-valve projectors. Projection systems for NTSC video using TFT-switched AMLCDs are already on the market and an HDTV projector using such LCDs is described in an article entitled "A 750-TV-Line-Resolution Projector Using 1.5 Megapixel a-Si TFT LC Modules", by K. Kazuhiko, et al., SID91 DIGEST, pp. 415-418, and details of the LC modules used in the system are described in a companion paper by Y. Okita, et al. appearing on pp. 411-414 of the same journal entitled "A 1.5-Megapixel a-Si TFT-LCD Module for HDTV Projector". The structure of the optical system of the projector described in these articles is shown in FIG. 1.

Referring to FIG. 1, light from a source of white light, such as a metal halide lamp 10, is formed into parallel optical beams by a dichroic reflector 12. Two dichroic mirrors 14 and 16 split the beams into red, blue and green beams and directs them through respective condenser lenses to respectively illuminate a red LC panel 18, a blue LC panel 20 and a green LC panel 22, each of which has a size of 67.5 mm × 120 mm and about 1.5 million pixels (1024 × 1440). As each beam passes through its respective LC panel its transmittance is modulated in accordance with a processed video signal and synch pulses applied to the active matrix. The modulated beams are then recombined by two dichroic mirrors 24 and 26, and the combined beam is projected onto a large screen by a projection lens 28. It is seen that the system is comprised of two sets of dichroic mirrors, one set (14 and 16) for color separation and another set (24 and 26) for color combination, two reflection mirrors 30 and 32 respectively associated with the separating and combining sets of dichroic mirrors and three LC panels 18, 20 and 22.

However, the light efficiency of such LCD projectors is rather limited (about one lumen per watt) and their maximum light output is also quite limited (about fifty lumens per square inch of liquid crystal), primarily because a large fraction of the incident light (up to about 70%) is intercepted by the transistors and matrix-addressing lines embodied in the TFT-LCD panel. This not only reduces the efficiency, but also causes overheating of the matrix; the authors of the article first listed above acknowledge that the most significant problem remaining in projectors that use LCD panels is suppressing high panel temperatures. Although projectors that use LC panels are usually designed to eliminate harmful infra-red and ultraviolet radiation emitted by the source, the dissipation of heat caused by the absorption in the panel of visible light is a basic limiting factor. Picture contrast ratio decreases as the temperature of the panel increases, and long-term use under these conditions eventually destroys the panel. The limited temperature the panels can tolerate, and the limited heat dissipation of the panel, limits the maximum light output and, accordingly, limits the brightness and quality of the projected picture.

Another factor which adversely affects the efficiency of projectors utilizing LC panels is the need to polarize the light; this reduces the light available by a minimum of a factor of two, with the unused light being absorbed by the polarizer. While it would appear that this problem could be obviated by using liquid crystal materials which do not require polarized light, such as polymer dispersed LC material, the scattering mode of such materials cannot at the same time achieve the high brightness and high contrast ratio necessary for projection of high quality pictures. High contrast can only be obtained by using a small aperture projection lens. Since a large aperture projection lens is required for high brightness, use of polymer dispersed LC material would limit the total light flux to an unacceptably low level.

It is a primary object of the present invention to provide an improved projector using liquid crystal modules as light-valves, which has improved efficiency and light output as compared to currently available projectors of this type.

It is a further object of the invention to provide a color image projection system which has good contrast ratio and good efficiency at the same time with a large aperture projection lens.

A further object of the invention is to provide a color projection system that uses fewer dichroic mirrors and fewer LC panels than available projectors of this type and, therefore, is simpler and less costly to manufacture.

SUMMARY OF THE INVENTION

The present invention is directed to apparatus for improving the efficiency and light output of projectors using active matrix LC panels as light valves. In accordance with one aspect of the invention, efficiency is improved and light output increased by registering a lenticular lens plate with the LC panel for focussing the light illuminating the panel onto transparent areas of the matrix so that the areas occupied by transistors and electrodes are not illuminated and, accordingly, are not heated by absorption of radiation. A matching lenticular lens plate may also be used on the output side of the LC panel to make the projected image appear to be uniformly illuminated.

In accordance with another aspect of the invention light efficiency and output of a light projector are improved by using LC panels constructed of a birefringent material, such as a nematic liquid crystal, having embodied therein an interdigital electrode structure which when a potential is applied to alternate electrodes produces a phase diffraction grating that diffracts incident light regardless of its polarization and, therefore, will operate with unpolarized light. Two of such LC panels, having differing spacings of the interdigital electrodes, are incorporated in a schlieren optical system which is, in turn, disposed between a light source and a projection lens. In a preferred embodiment, light from a source of white light is formed into parallel optical beams which are directed through an input light mask of the schlieren system onto a dichroic mirror which splits the beams into magenta and green beams. Respective reflection mirrors direct the magenta and green beams through respective schlieren lenses to respectively illuminate a magenta LC panel having two sets of interdigital electrodes for selecting red and blue and a green LC panel having a simple set of interdigital electrodes. As each beam passes through its respective LC panel its transmittance is modulated in accordance with processed video signals applied to the active matrix. The modulated beams are then recombined by a green-magenta dichroic mirror and the combined beam is directed through an output light mask and projected onto a screen by a projection lens.

The need for only two LC panels instead of the three used in the described prior art system means that only two rather than four dichroic mirrors are needed for color separation and combination, and also outs in half the distance between the projection lens and the LC panels. This factor of two reduction in back focal length reduces by about a factor of eight the cost of the projection lens for a given f-number.

Other objects, features and advantages of the invention will become apparent, and its construction and operation better understood, from the following detailed description, read in conjunction with the accompanying drawings.

DESCRIPTION OF THE PREFERRED EMBODIMENT

Figure 2:
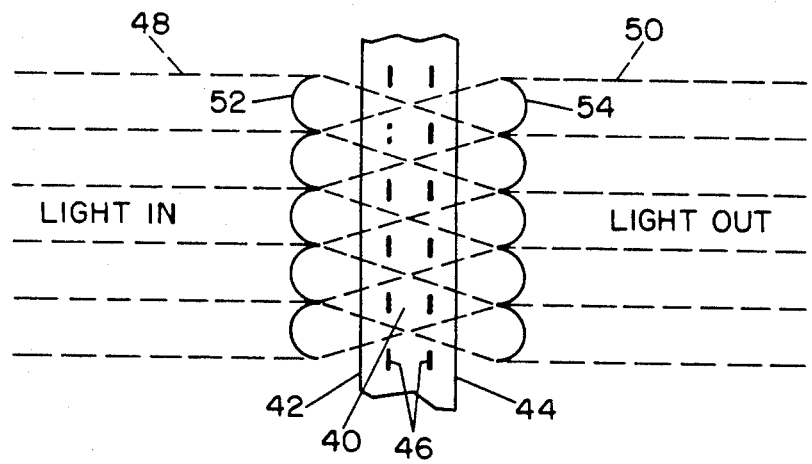
FIG. 2 is a fragmentary, greatly enlarged edge view of a TFT-LCD panel which shows one aspect of the present invention.

The reason for the limited light efficiency and light output of prior art LCD projectors is depicted in FIG. 2 which illustrates, greatly exaggerated, the construction of a TFT-LCD panel, such as the 1.5 megapixel panel described in the above-mentioned Okita et al paper. Basically, the panel comprises a thin layer of liquid crystal material 40 contained between parallel transparent conductive plates 42 and 44 and column electrodes and transistors 46 disposed in the liquid crystal material. As used in prior art projectors, a large fraction of the incident light, represented by the parallel dash lines 48, is intercepted by the column electrodes and transistors 46 embodied in the panel with the consequence that only about fifty percent of the incident light is transmitted through the transparent areas between the column electrodes and transistors. Thus, the efficiency and light output are reduced and, more seriously, the matrix is overheated leading to its eventual destruction.

In accordance with one aspect of the present invention, the light efficiency and light output of an LC panel is greatly improved by registering a lenticular lens plate 52 with the display area of the panel so as to focus the input light 48 onto the transparent areas of the matrix, i.e., the areas between the column electrodes and transistors, as shown in FIG. 2, so that the transistors and electrodes are not illuminated to any significant degree that is to say, the transistors and electrodes do not intercept much of the input light and therefore are not overheated and, of course, a larger fraction of the incident light passes through the panel. Since somewhere between 50% and 75% of the area of LC panels in current use is transparent, a properly registered lenticular lens plate placed ahead of the panel causes it to appear entirely transparent because substantially all of the incident light is passed through the transparent areas. A matching lenticular lens plate 54 may also be used on the output side of the LC panel for making the image appear to be uniformly illuminated rather than as dots and lines as would be the case without the output lens plate. Either the illustrated spherical lenses or cylindrical lenses may be used. If the LC panel has transparent ITO row electrodes there is an advantage in using cylindrical lenses.

Figure 3:
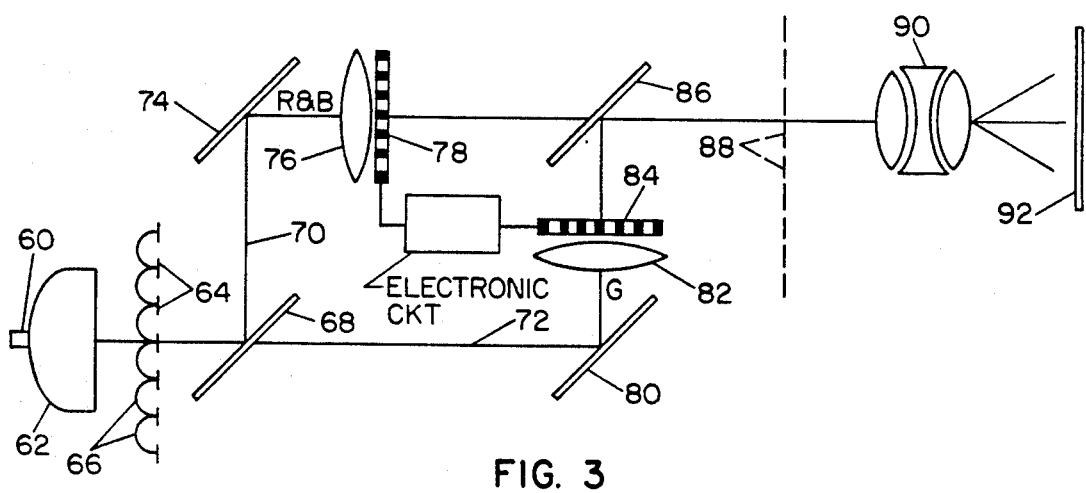
FIG. 3 is a schematic diagram of an optical system of a projector constructed in accordance with the present invention.

Referring now to FIG. 3, there is shown a simplified schematic diagram of the optical system of a projector in accordance with a preferred embodiment of the invention. Light from a source of white light, such as a metal halide lamp 60, is formed into parallel optical beams by a dichroic reflector 62 of known construction that also removes harmful infrared and ultraviolet radiation. The parallel optical beams are directed through an input light mask 64 of a schlieren optical system consisting of an array of bars between which there are transparent areas or slits, whereby the light transmitted by each transparent area appears to originate from a different source of light. In order to maximize the transmission of light through the light mask the parallel optical beams from the source are focussed onto the slits by a lenticular lens plate 66 registered with the array of bars.

The optical beams transmitted by the light mask 64 are directed onto a green-magenta dichroic mirror 68 which splits the beams into a magenta beam 70 (red and blue) and a green beam 72. The magenta beam 70 is reflected by a heat transmitting reflection mirror 74 onto and through a schlieren lens 76 to illuminate an LC panel 78, hereinafter sometimes referred to as a "magenta" panel. The green beam 72 is reflected by a heat transmitting reflection mirror 80 onto and through a second schlieren lens 82 to illuminate a second LC panel 84, hereinafter characterized as a "green" panel. As each of beams 70 and 72 passes through its respective LC panel the red, blue and green components of the light from the source are selected by diffraction in a manner to be described and their intensities modulated in accordance with processed video signals applied to the panels by associated electronic circuitry 85. The modulated beams are recombined by a second green-magenta dichroic mirror 86, and the combined beam is directed through an output light mask 88 consisting of an array of schlieren bars, and projected onto a screen 92 by a projection lens 90.

In accordance with the invention, the LC panels 78 and 84 each function as light modulating medium, the light modulating characteristics of which are controlled in accordance with color intelligence signals by applying the signals to the panels, and unlike prior art LC panels include in addition to the matrix electrodes, a structure of interdigital electrodes which form a color-selecting diffraction grating. As is known from applicant's U.S. Pat. No. Re. 25,169 for "Colored Light System" and several others of his patents directed to the "Talaria" light-valve projector manufactured by General Electric Company, a diffraction grating is a light transmitting or reflecting medium which breaks up a ray of monochromatic light into a series of light and dark bands, or white light into colored bands of the spectrum of light present in the ray. White light is generally considered to be but is not necessarily limited to light made up of all color components in the visible spectrum, which may be considered to be light with wavelengths ranging from about 4000 to 8000 angstrom units. Light of a single component color having a single wavelength only, is generally defined as monochromatic light.

In the system described in U.S. Pat. No. Re. 25,169, a diffraction grating is formed by distorting the surface of a medium so that light projected through or reflected from the medium is diffracted into its component colors. The respective color components follow paths which deviate from a line normal to the effective plane of the medium by an amount which is a function of the wavelength of the particular color component. This patented system utilizes a system of bars and slits which are so oriented with respect to the medium that the wavelength of the light that is passed by the slit system is controlled by the modulating medium. Three diffraction gratings are effectively superimposed on the modulating medium to form a single composite grating so that a color image is passed by the system of slits which corresponds to the color intelligence applied to distort the modulating medium.

In the system according to the present invention, two diffraction gratings, each comprising a system of bars and slits, are embodied in the "magenta" LC panel 78, and a third diffraction grating also comprising a system of bars and slits is embodied in the "green" LC panel 84. The bars and slits of each grating are so oriented with respect to the liquid crystal material of the respective panel that the wavelength of the light that is passed by each slit system corresponds to the color intelligence applied to the LC panel to distort the LC modulating medium. Preferably the LC panels are constructed of a birefringent material such as a nematic liquid crystal, and each of the diffraction gratings is controlled by a system of electrodes incorporated in the LC panel which form a system of bars and slits which when a potential which corresponds to color intelligence is applied to the LC panel to periodically modulate the index of refraction of the birefringent material, thus producing a phase diffraction grating that diffracts incident light, regardless of its polarization.

Figure 4A:
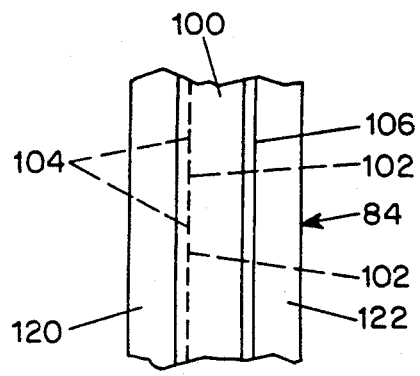
FIGS. 4A and 4B are diagrammatic side and top views, respectively, of a fragmentary portion of a TFT-LCD panel for green light.
Figure 4B:
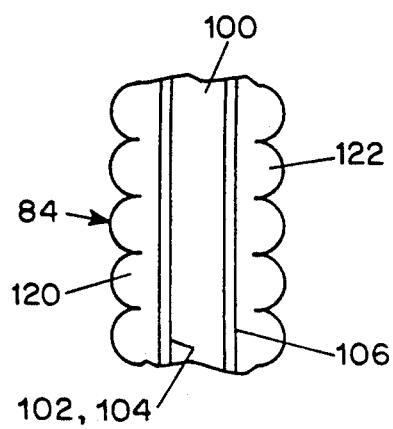

More particularly, and with reference to FIGS. 4A and 4B which respectively are diagrammatic side and top views of a fragmentary portion of the "green" active matrix LCD panel 84, the panel is similar in construction to the TFT-LCD described in the Okita et al. paper in that it contains a matrix of a sufficient number of column and row electrodes and transistors (e.g., $1024 \times 1440$) to form 1.5 million pixels so as to be suitable for projection of HDTV, and utilizes a birefringement liquid crystal material, such as nematic liquid crystal. It differs in that transparent electrodes 102 are incorporated within the display area of the matrix interdigitally with the transparent row electrodes of the standard matrix. The electrodes 102 and 104 are disposed on the substrate of the active matrix on one side of the liquid crystal material 100 and a grounded electrode 106 is disposed on the other side. For clarity, the matrix electrodes are not shown in FIG. 4A and FIG. 4B; the interrelationship of the interdigital and matrix electrodes will be described presently with reference to FIG. 6. The electrodes 102 which form a system of bars and slits may have a spacing in the range from 3.5 to 5 cycles per pixel, which as will be seen is approximately 20% longer wavelength than that used for blue. However, since only green light passes through the "green" panel, it does not have to select color at all; the grating wavelength is simply chosen to give the best efficiency for green, that is, to diffract green light from the center of a bar to the center of the nearest slit in the schlieren bars.

Figure 5A:
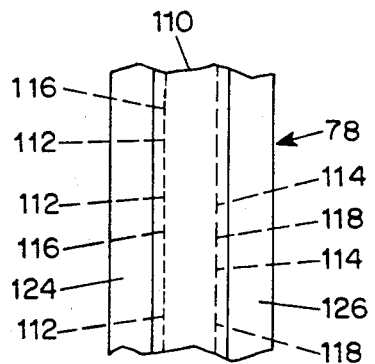
FIGS. 5A and 5B are diagrammatic side and top views, respectively of a fragmentary portion of a TFT-LCD panel for selecting red and blue light.
Figure 5B:
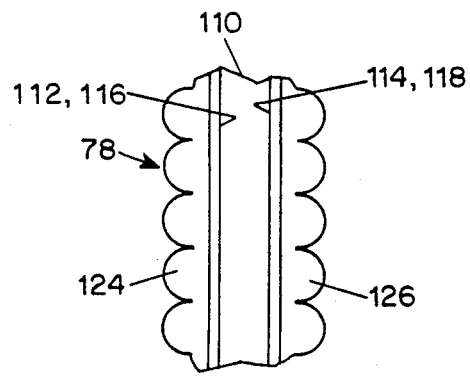

FIGS. 5A and 5B are side and top views, respectively, of a fragmentary portion of the "magenta" AMLCD panel 78, again without the matrix electrodes, which is similar in construction to panel 84 except that it contains two systems of interdigital electrodes disposed on opposite sides of the liquid crystal material 110. A first system 116 having electrodes spaced for red, in the range from 4 to 8 cycles per pixel, is positioned near the transparent input electrode 112, and a second system 118 having electrodes spaced for blue, in the range from 3 to 6 cycles per pixel, is positioned near the transparent output electrode 114. That is to say, the spacing of the "red" electrodes is approximately three-fourths the spacing of the "blue" electrodes. The number of cycles per pixel, for red and blue, is chosen to be proportioned to the wavelength transmitted through the schlieren optical system. The result of the differing spacings of the "red" and "blue" electrodes, and the fact that the applied magenta light passes through superimposed "red" and "blue" diffraction gratings, the diffraction process separates red from blue, which are at opposite ends of the visible spectrum. When red light is passed by the panel, blue light is diffracted to hit the schlieren bars 88; conversely, when the panel passes blue light, red light is diffracted to hit the schlieren bars 88. This has the important advantage that all higher order diffracted light also hits the bars of the output mask. All three colors are diffracted in the vertical direction.

While it would appear obvious from the foregoing discussion of FIG. 2 to use spherical lenticular lenses to focus the light incident on panels 78 and 84 onto the transparent slits of the diffraction gratings, this cannot be done because the lenses would adversely interact with the schlieren optical system and reduce contrast in the projected image. Instead, lenticular cylindrical lenses oriented at right angles to the direction that light is diffracted are used so a not to interfere with the schlieren optical system. Input and output lenticular lens plates of cylindrical lenses for the "green" panel 84 are shown in FIGS. 4A and 4B at 120 and 122, respectively, and for the "magenta" panel are shown in FIGS. 5A and 5B at 124 and 126, respectively. However, in order to be able to use cylindrical lenses to focus light in lines in between the opaque transistors and metal column electrodes of the LC panel it is necessary that the interdigital control electrodes be transparent.

Figure 6:
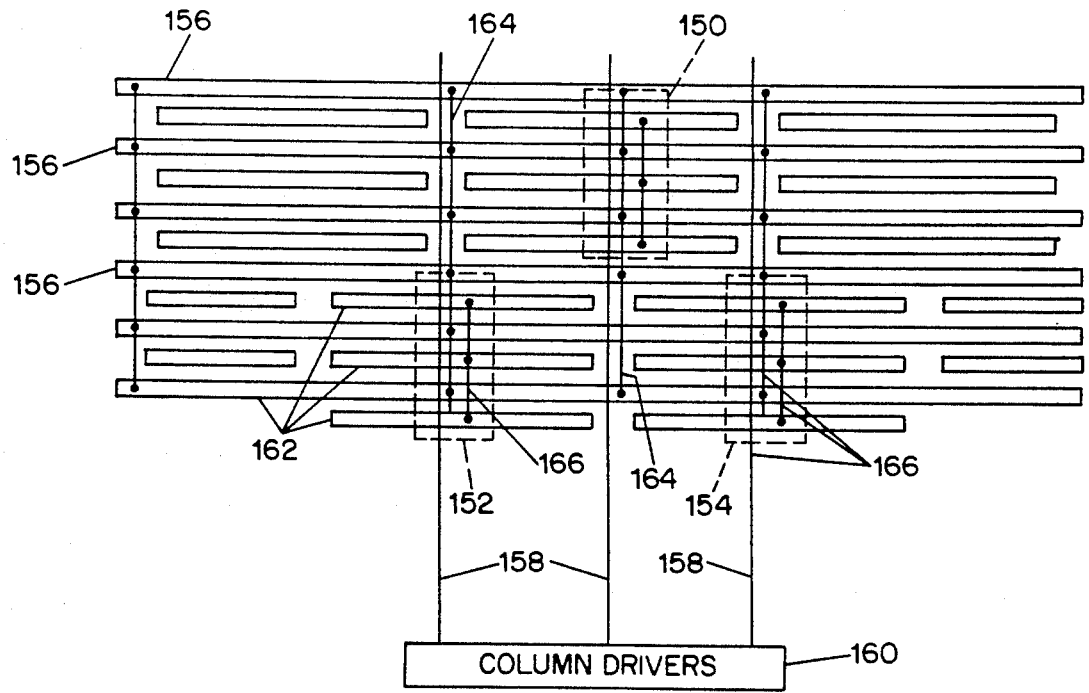
FIG. 6 is a plan view of a fragment of a TFT-LCD panel constructed in accordance with the invention.

An example of the layout for one of the AMLCD panels is shown in FIG. 6; the electrodes are, of course, shown greatly enlarged, and the transparent front and back plates of the panel are omitted. The illustrated fragment of the panel, which would be fabricated using known TFT-LCD techniques, includes three transistors 150, 152 and 154 each having base, emitter and collector electrodes, a multiplicity of transparent row driver electrodes 156 which drive the base of the transistors, metal interconnects 158 for connecting the column drivers 160 of the associated electronic circuit to the emitters of respective transistors, and a multiplicity of transparent electrodes 160 disposed between successive row driver electrodes and connected to the collector of a transistor. The row electrodes 156 and the interdigital electrodes 162, which form the diffraction grating preferably are formed of indium tin oxide (ITO), the same material as is currently used for the electrodes of LC panels. Several row drives 156, six in the illustrated example, are used with each transistor by connecting them together and to the base of the transistor with a metal electrode 164, which is insulated from the ITO electrodes except at the point of punch through. Similarly, three interdigital electrodes 162 are connected together and to the collector of a respective transistor with a metal electrode 166, which also are insulated from the ITO electrodes except at punch through. The metal electrodes 158 which connect the column drivers to the emitter of a respective transistor are also insulated from the ITO electrodes.

Application of a potential to the interdigital electrodes by the simultaneous application of row and column driver pulses to the transistor associated therewith, in a panel using a birefringent material such as a nematic liquid crystal, produces a diffraction grating which diffracts incident light regardless of its plane of polarization and will, therefore, operate with unpolarized light. FIG. 6 shows interdigital electrodes 162 disposed in only one plane, which would be the case for the "green" panel 84; the "magenta" panel 78 would have such electrodes disposed on the source insulating substrate as their TFT transistor driver in two spaced apart planes located on opposite sides of the liquid crystal material used in the panel.

Figure 1:
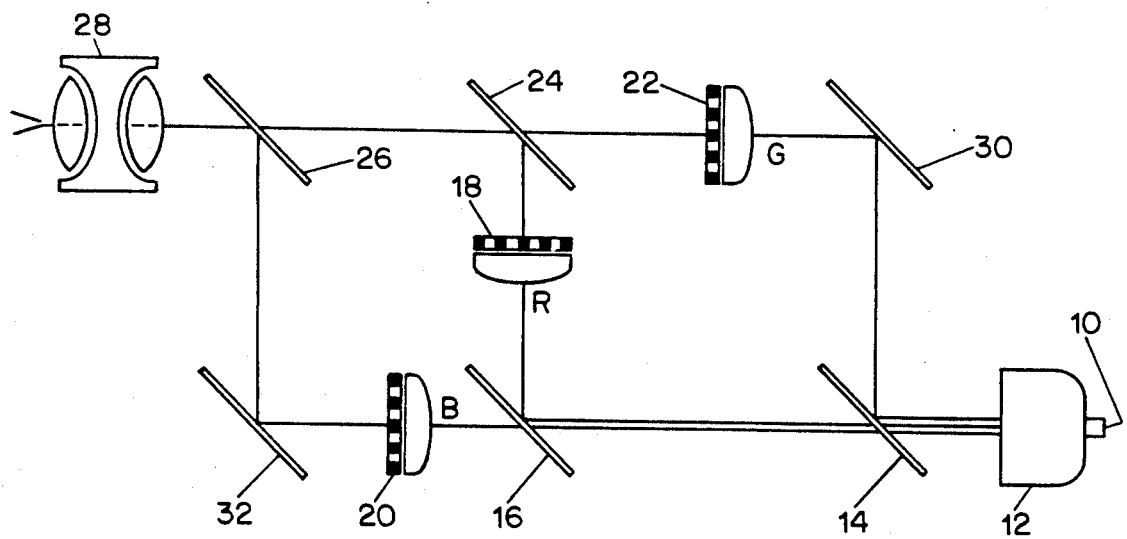
FIG. 1 is a schematic diagram of the optical system of a prior art projector to which reference has already been made.

Therefore, as in the prior art system of FIG. 1, the present system has three active matrix panels with the R, G and B video addressed to the proper pixel on each panel. Addressing is done using shift registers to switch the video to the switching transistors at the intersections of rows and columns. However, in the present system two of the matrix arrays are placed face-to-face to form a single panel which is addressed for both red and blue. As in the prior art system, one of the three matrix arrays must be addressed in reverse order because its optical image is a mirror image of the other two.

A comparison of the present system illustrated in FIG. 3 with the prior art system shown in FIG. 1 clearly demonstrates that by utilizing diffraction gratings for color selection in LC panels containing a liquid crystal material which is operable with unpolarized light, the total path length through the optical system is shortened by about a factor of two, and the distance between the projection lens and the liquid crystal panels is also cut in half. This factor of two reduction in back focal length reduces the cost of projection lens 90 by about a factor of eight for a given f-number; the f-number determines the amount of light the projector can put out. Additionally, the need for only two LC panels instead of three, albeit of more complex construction, and as a consequence the need for only two instead of four dichroic mirrors and two less reflection mirrors, further simplifies and reduces the cost of the projector.

The use of lenticular lens plate 64 at the input light mask to focus the incoming light through the slits increases the efficiency of the system. Using a metal halide arc lamp as the light source the system is expected to have an efficiency of about four lumens per watt of input power, which is about four times the efficiency of currently available AMLCD projectors of the type shown in FIG. 1 and four times the efficiency of General Electric's "Talaria" projector.

While the invention has been described with respect to a certain specific embodiment, it will be appreciated that many modifications and changes can be made without departing from the spirit of the invention. For example, the transparent electrodes which form the diffracting grating may be interdigitated with the column drivers, instead of the row drivers, in which case all three colors would be diffracted in the horizontal direction which, in turn, would require rotation of the input and output light masks of the schlieren optical system. It is intended, therefore, by the following claims, to cover all such modifications and changes as fall within the true spirit and scope of the invention.

I claim:

1. A projector system including a projection lens for projecting on a screen a color image corresponding to electronic video information comprising:
   a first light modulating liquid crystal panel containing a first diffraction grating having parameters corresponding to a first primary color;
   a second light modulating liquid crystal panel containing second and third diffraction gratings having parameters corresponding to second and third primary colors, respectively;
   a schlieren optical system having input and output light masks each comprising an array of bars and slits;
   a first dichroic mirror for separating a beam of polychrome light into two beams, a first beam containing said first primary color and a second beam containing said second and third primary colors;
   a light source for projecting substantially parallel beams of polychrome light through said input light mask onto said first dichroic mirror;
   means including first and second mirrors for directing said first and second beams onto said first and second liquid crystal panels, respectively; and
   a second dichroic mirror for combining the light passed by said first and second liquid crystal panels and directing the combined beam through said output light mask to said projection lens.

2. The projector system as defined by claim 1, wherein said first primary color is green, said second and third primary colors are red and blue, respectively, and said first and second dichroic mirrors are green-magenta dichroic mirrors.

3. The projector system as defined by claim 1, wherein said system further comprises lens means registered with said input light mask for focussing beams of light from said source through the slits of the input light mask for improving the light efficiency of the system.

4. A projector system as defined in claim 3 wherein said lens means comprises a plate of spherical lenticular lenses.

5. A projector system as defined in claim 1, wherein said first liquid crystal panel contains a matrix of column electrodes and transparent row electrodes and said first diffraction grating comprises an array of transparent electrodes interdigitally arranged between either the row or the column electrodes of said matrix, and has parameters corresponding to said first color, and wherein said second liquid crystal panel contains a matrix of column electrodes and row electrodes, and wherein said first and second diffraction gratings each comprise a respective array of transparent electrodes interdigitally arranged between electrodes of said matrix corresponding to those between which the transparent electrodes are arranged in said first panel, said respective arrays being spaced from each other and having parameters corresponding to said second and third colors, respectively.

6. The projector system as defined in claim 5, wherein said first, second and third primary colors are green, red and blue, respectively, wherein said first and second dichroic mirrors are green-magenta dichroic mirrors, and wherein said first and second diffraction gratings in said second liquid crystal panel are superimposed and have parameters corresponding to red and blue, respectively.

7. The projector system as defined in claim 5, wherein said system further comprises lens means registered with each of said first and second liquid crystal panels for focussing light through transparent areas of the panel for increasing the light output of the panels and reducing unwanted heating of the matrix electrodes.

8. The projector as defined in claim 7, wherein said lens means comprises a plate of cylindrical lenticular lenses oriented at right angles to the electrodes forming said diffraction gratings.

9. A projector system as defined in claim 5, wherein said system further comprises lens means registered with both input and output sides of each of said first and second liquid crystal panels, wherein said lens means comprises a plate of cylindrical lenticular lenses oriented at right angles to the electrodes forming said diffraction gratings, the lenses at the input side for focussing light through transparent areas of the panel for increasing the light output of the panel and reducing unwanted heating of matrix electrodes, without interfering with the operation of said schlieren optical system, and the lenses at the output side for causing appearance of uniform illumination of the output side.

10. A projection color system for producing a color image on a screen corresponding to an applied color signal, said system comprising:

a light source for producing a beam of primary red, blue and green colors, first dichroic mirror means for separating said beam into a first beam containing green and a second beam containing red and blue, first and second panels positioned generally perpendicular to said first and second beams, respectively, and each containing a liquid crystal medium, said first panel containing a diffraction grating having parameters corresponding to green and said second panel containing two superimposed diffraction gratings respectively having parameters corresponding to red and blue, which by diffraction separates red from blue, second dichroic mirror means for combining light passed by said first and second liquid crystal panels; and a first light mask provided with slits for transmitting to a projection lens first order diffracted light diffracted by said gratings.

11. The projection color system as defined in claim 10, wherein said system further comprises a second light mask positioned between said light source and said first dichroic mirror means and provided with slits for transmitting to said first dichroic mirror means a plurality of light beams that are incident on the diffracting elements of said first and second panels.

12. The projection color system as defined in claim 11, wherein said second and first light masks are the input and output, respectively, of a schlieren optical system, and wherein said schlieren optical system further includes first and second schlieren lenses for imaging on said first light mask light transmitted through said first and second panels.

13. The projection color system as defined in claim 10, wherein said system further comprises:

first lens means registered with each liquid crystal panel for focusing incident light through transparent areas of the panels and improving the light efficiency of the projection system.

14. The projection color system as defined in claim 13, wherein said system further comprises:

second lens means registered with said first light mask for focusing light from said source through the slits of the mask.

15. A projector system for producing a color image on a screen corresponding to an applied color signal, said system comprising:

a schlieren optical system having input and output light masks each comprising an array of bars and slits;

a light source for producing and directing onto said input light mask a beam of primary red, blue and green colors;

means including a first light modulating liquid crystal panel containing a first diffraction grating having parameters corresponding to green;

means including a second light modulating liquid crystal panel containing superimposed second and third diffraction gratings having parameters corresponding to red and blue, respectively;

first mirror means including a first dichroic mirror for separating the light beams passed by said input light mask into a first beam containing green and a second beam containing red and blue and directing said first and second beams onto said first and second liquid crystal panels, respectively; and means including mirror means for combining and directing onto said output light mask the light passed by said first and second liquid crystal panels and transmitting to a projection lens first order diffracted light diffracted by said gratings.

16. The projector system as defined by claim 15, wherein said system further comprises:

first lens means registered with said input light mask for focussing light from said source through the slits of the mask, and second lens means registered with each liquid crystal panel for focussing incident light through transparent areas of the panels thereby to improve the light efficiency of the projection system.

17. The projector system as defined by claim 15, wherein said liquid crystal panels contain a liquid crystal material which produces a diffraction grating which diffracts incident light regardless of its plane of polarization.

18. The projector system as defined by claim 15, wherein said first mirror means comprises a first green-magenta dichroic mirror, a first reflecting mirror for directing said first beam onto said first liquid crystal panel and a second reflecting mirror for directing said second beam onto said second liquid crystal panel, and wherein said second mirror means comprises a second green-magenta dichroic mirror.

* * * * *